US012311757B2

(12) United States Patent
Okazaki et al.

(10) Patent No.: US 12,311,757 B2
(45) Date of Patent: May 27, 2025

(54) POWER TRANSMISSION MECHANISM

(71) Applicant: KUBOTA CORPORATION, Osaka (JP)

(72) Inventors: Kazuto Okazaki, Sakai (JP); Sumio Yagyu, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 469 days.

(21) Appl. No.: 17/837,259

(22) Filed: Jun. 10, 2022

(65) Prior Publication Data

US 2022/0297534 A1    Sep. 22, 2022

Related U.S. Application Data

(63) Continuation of application No. PCT/JP2021/000427, filed on Jan. 8, 2021.

(30) Foreign Application Priority Data

Jan. 14, 2020 (JP) ................. 2020-003765

(51) Int. Cl.
  *B60K 17/24*  (2006.01)
  *B60K 6/26*   (2007.10)
  *B60K 6/30*   (2007.10)
  *B60K 6/405*  (2007.10)
  *B60K 6/485*  (2007.10)

(52) U.S. Cl.
  CPC ............... *B60K 17/24* (2013.01); *B60K 6/26* (2013.01); *B60K 6/30* (2013.01); *B60K 6/405* (2013.01); *B60K 6/485* (2013.01); *Y02T 10/62* (2013.01)

(58) Field of Classification Search
  CPC . B60K 17/24; B60K 6/26; B60K 6/30; B60K 6/405; B60K 6/485; Y02T 10/62
  USPC .................................................... 180/65.245
  See application file for complete search history.

(56) References Cited

U.S. PATENT DOCUMENTS

| 7,992,661 B2* | 8/2011 | Nomura | F16F 15/123 |
| | | | 180/65.245 |
| 11,015,657 B2* | 5/2021 | Yagyu | F16D 3/78 |
| 2007/0163823 A1 | 7/2007 | Abe et al. | |
| 2010/0323804 A1 | 12/2010 | Himmelmann | |

(Continued)

FOREIGN PATENT DOCUMENTS

| JP | 2002-087080 A | 3/2002 |
| JP | 2005-059788 A | 3/2005 |
| JP | 2008-126703 A | 6/2008 |

(Continued)

OTHER PUBLICATIONS

Official Communication issued in corresponding European Patent Application No. 21741515.7, mailed on Jan. 19, 2024.

(Continued)

*Primary Examiner* — Greg Binda
(74) *Attorney, Agent, or Firm* — Keating & Bennett, LLP

(57) ABSTRACT

A power transmission mechanism includes an engine including a crankshaft, a flywheel connected to the crankshaft, an electric motor including a rotor to rotate together with a rotary shaft, a damper connected to the rotary shaft and the flywheel, and a driven machine to receive power from the engine and/or the electric motor. The damper is located between the engine and the electric motor in an axial direction of the rotary shaft.

10 Claims, 3 Drawing Sheets

(56) References Cited

U.S. PATENT DOCUMENTS

2017/0129322 A1     5/2017   Yagyu et al.
2018/0328413 A1*   11/2018   Yagyu ........................ F16D 3/52

FOREIGN PATENT DOCUMENTS

| JP | 2008-290594 A | 12/2008 |
| JP | 2010-247786 A | 11/2010 |
| JP | 2012-071731 A | 4/2012 |
| WO | 2015/194419 A1 | 12/2015 |

OTHER PUBLICATIONS

Official Communication issued in International Patent Application No. PCT/JP2021/000427, mailed on Mar. 30, 2021.

* cited by examiner

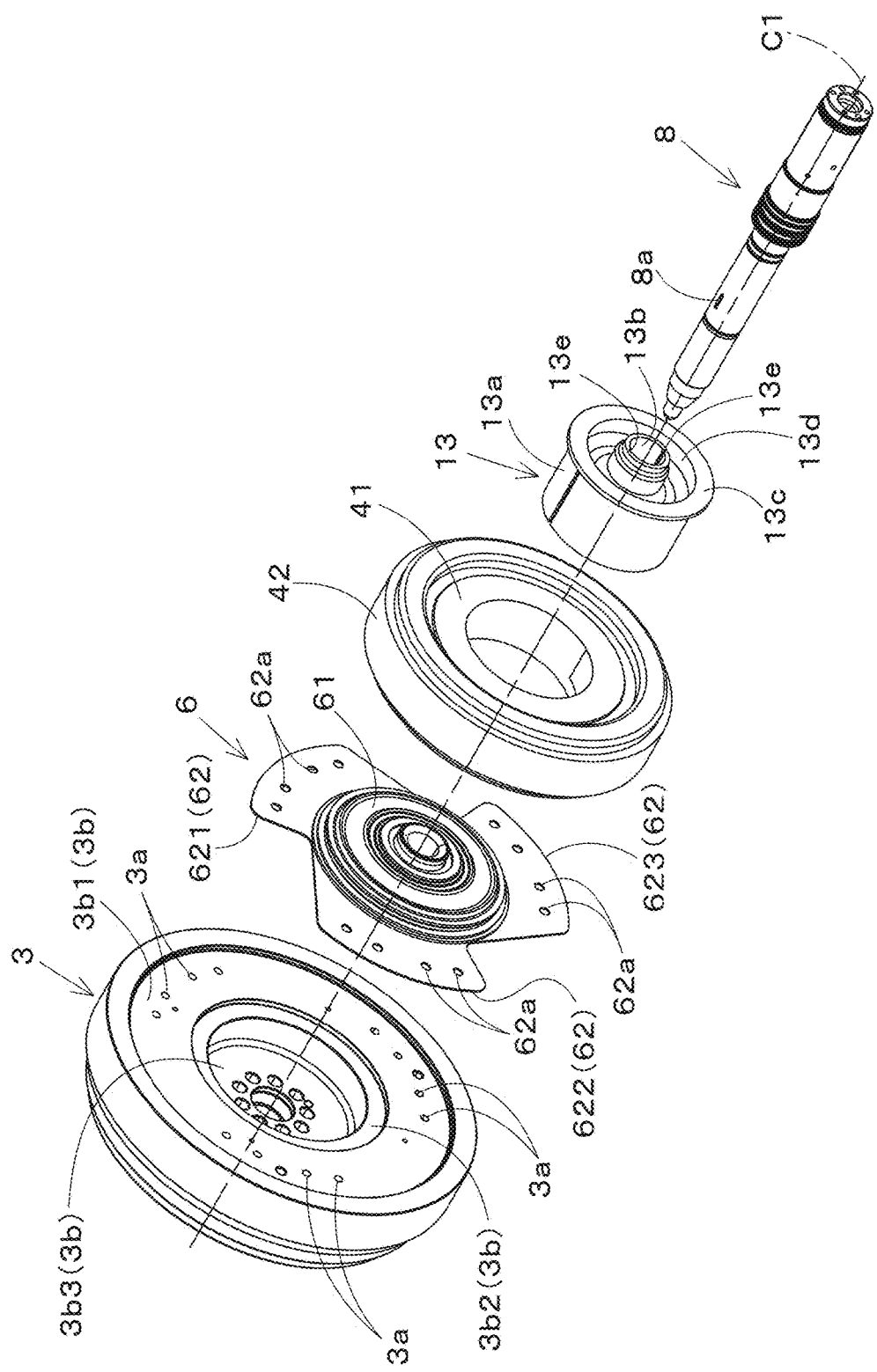

POWER TRANSMISSION MECHANISM

CROSS REFERENCE TO RELATED APPLICATIONS

This application is a continuation application of International Application No. PCT/JP2021/000427 filed on Jan. 8, 2021, which claims the benefit of priority to Japanese Patent Application No. 2020-003765 filed on Jan. 14, 2020. The entire contents of each of these applications are hereby incorporated herein by reference.

BACKGROUND OF THE INVENTION

1. Field of the Invention

The present invention relates to a power transmission mechanism including an electric motor.

2. Description of the Related Art

Techniques disclosed in Japanese Unexamined Patent Application Publication No. 2008-290594 and Japanese Unexamined Patent Application Publication No. 2012-71731 are each known as a power transmission mechanism including an electric motor. The techniques disclosed in Japanese Unexamined Patent Application Publication No. 2008-290594 and Japanese Unexamined Patent Application Publication No. 2012-71731 are such that the electric motor is disposed between an engine and a driven machine. More specifically, the technique disclosed in Japanese Unexamined Patent Application Publication No. 2008-290594 is such that the electric motor is connected to the engine and the driven machine (transmission). The technique disclosed in Japanese Unexamined Patent Application Publication No. 2012-71731 is such that a damper device is disposed in a power train which transmits power from the engine to the electric motor.

SUMMARY OF THE INVENTION

However, the technique disclosed in Japanese Unexamined Patent Application Publication No. 2008-290594 has an issue in that a rotor of the electric motor is susceptible to torque variations of the engine. On the other hand, with the technique disclosed in Japanese Unexamined Patent Application Publication No. 2012-71731, although torque variations of the engine can be absorbed by the damper device, the technique disclosed in Japanese Unexamined Patent Application Publication No. 2012-71731 has an issue in that, since the damper device is disposed radially inside the rotor of the electric motor, the outer diameter of the electric motor is large and the electric motor cannot be easily mounted on a vehicle or the like.

Preferred embodiments of the present invention provide power transmission mechanisms each being able to absorb torque variations of the engine and which can be easily mounted on a vehicle or the like.

Preferred embodiments of the present invention may include the following technical features.

A power transmission mechanism according to an aspect of a preferred embodiment of the present invention includes an engine including a crankshaft, a flywheel connected to the crankshaft, an electric motor including a rotor to rotate together with a rotary shaft, a damper connected to the rotary shaft and the flywheel, and a driven machine to receive power from the engine and/or the electric motor, wherein the damper is located between the engine and the electric motor in an axial direction of the rotary shaft.

It is preferable that the driven machine include a transmission to transmit power from the engine and/or the electric motor to one or more wheels. It is preferable that the rotary shaft define and function as an input shaft of the transmission.

It is preferable that the power transmission mechanism further include a rotation detector to detect a phase of rotation of the rotor. It is preferable that the engine be located on one of opposite sides of the damper in the axial direction. It is preferable that the electric motor and the rotation detector be located on the other of the opposite sides of the damper in the axial direction.

It is preferable that the power transmission mechanism further include a bearing which rotatably supports the rotary shaft. It is preferable that the rotary shaft be provided, at an outer periphery thereof, with a torque transmitting portion to transmit rotational torque to the rotor. It is preferable that the torque transmitting portion include one or more keys or one or more splines.

It is preferable that the power transmission mechanism further include a flywheel housing which houses the flywheel, a motor case which is connected to the flywheel housing, and a transmission case which is connected to the motor case and which houses the transmission. It is preferable that the electric motor be housed such that the electric motor extends from an interior of the motor case to an interior of the transmission case. It is preferable that the rotary shaft extend from an interior of the flywheel housing through the interior of the motor case to the interior of the transmission case.

It is preferable that an end surface of the flywheel that faces the damper be recessed toward an opposite end surface of the flywheel to have a recessed portion. It is preferable that the damper is located in the recessed portion.

It is preferable that the damper include an inner section attached to the rotary shaft and an outer section attached to the flywheel. It is preferable that the recessed portion include a first recessed portion and a second recessed portion. It is preferable that the end surface of the flywheel be recessed to define a cylinder including the first recessed portion. It is preferable that an end surface of the first recessed portion be recessed to define a cylinder including the second recessed portion. It is preferable that the outer section is located in the first recessed portion. It is preferable that the inner section is located in the second recessed portion.

It is preferable that the damper overlap the flywheel housing and the motor case in the axial direction.

It is preferable that the power transmission mechanism further include a bearing which rotatably supports the rotary shaft, and a support cylinder which supports an outer circumferential surface of the bearing. It is preferable that the rotation detector be located in an interior space of the support cylinder.

It is preferable that the power transmission mechanism further include a rotor boss having an outer circumferential surface having the rotor attached thereto, and an inner circumferential surface fixed to the rotary shaft. It is preferable that the rotation detector be located between an inner circumferential surface of the support cylinder and the outer circumferential surface of the rotor boss.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is an exploded perspective view of a main configuration of the power transmission mechanism.

DETAILED DESCRIPTION OF THE PREFERRED EMBODIMENTS

Figure 1:
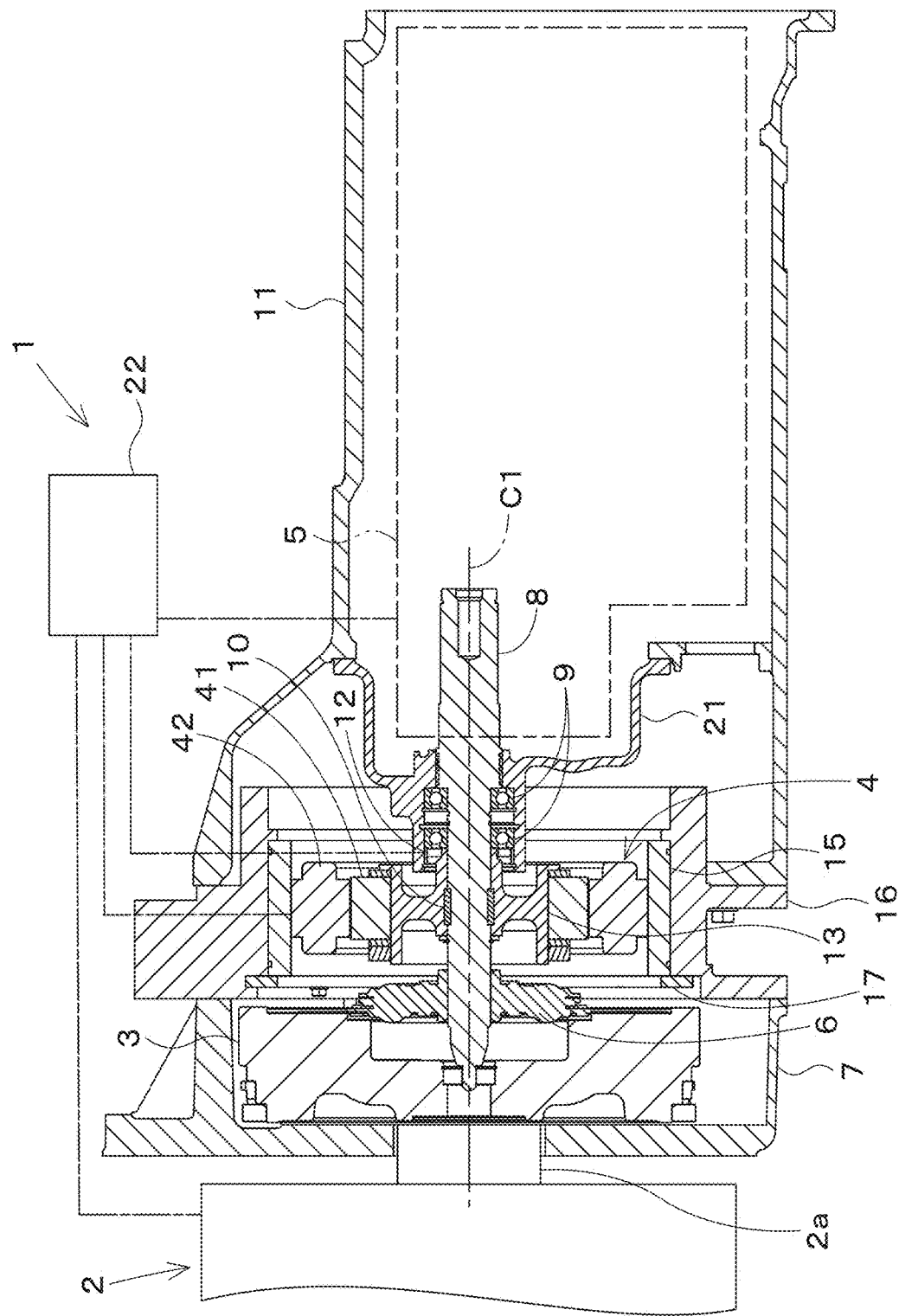
FIG. 1 is a cross-sectional view illustrating a preferred embodiment of a power transmission mechanism.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of power transmission mechanisms according to a preferred embodiment of the present invention with reference to drawings. The power transmission mechanisms according to preferred embodiments of the present invention may be used in, for example, industrial machines such as an agricultural machine (e.g., tractor, mower), a construction machine, a utility vehicle, and an engine generator.

FIG. 1 is a cross-sectional view of a preferred embodiment of a power transmission mechanism 1 according to the present invention.

As illustrated in FIG. 1, the power transmission mechanism 1 includes an engine 2, a flywheel 3, an electric motor 4, a driven machine 5, and a damper 6.

The engine 2 is a diesel engine, a gasoline engine, and/or the like. The engine 2 includes a crankshaft 2a. The crankshaft 2a projects toward the driven machine 5. The crankshaft 2a has the flywheel 3 connected thereto.

The flywheel 3 is substantially in the form of a disc, and is made of a material having a large mass (for example, a metal such as cast iron). The flywheel 3 has, connected to its center, the crankshaft 2a of the engine 2. The flywheel 3 rotates as the crankshaft 2a rotates. The flywheel 3 is housed in a flywheel housing 7.

The electric motor 4 is disposed on the same side of the flywheel 3 as the driven machine 5. The electric motor 4 includes a rotor 41 and a stator 42. The electric motor 4 is, for example, an interior permanent magnet three-phase A.C. synchronous motor, but any other type of synchronous motor may be used. For example, the electric motor 4 may be a synchronous motor in which laminated steel with coil windings is engaged with a rotor 41 or the like. The electric motor 4 may be an A.C. electric motor or a D.C. electric motor. In the present preferred embodiment, the electric motor 4 is a motor/generator which defines and functions also as a generator.

Figure 2:
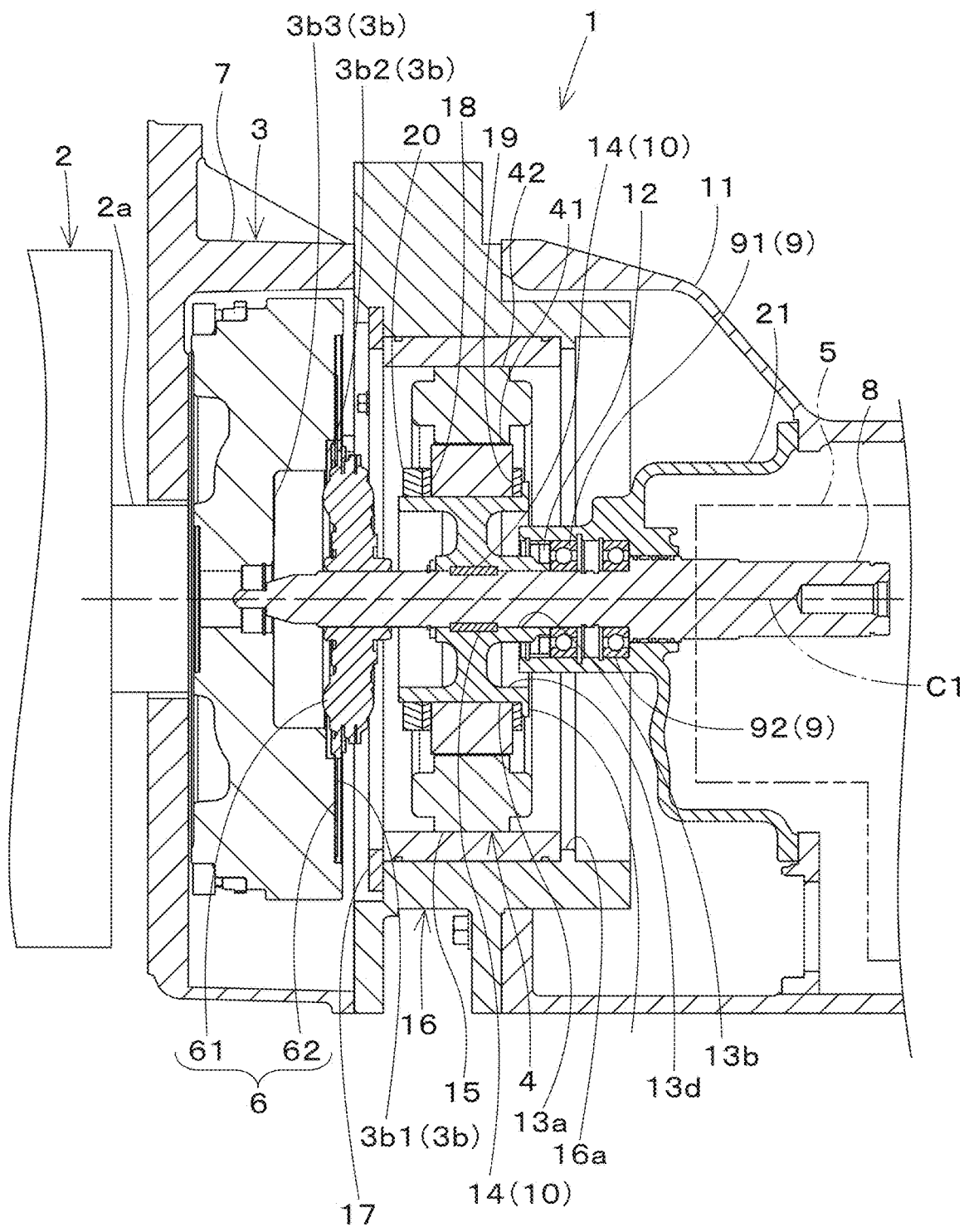
FIG. 2 is an enlarged view of a main part of FIG. 1.

The rotor 41 includes an iron core (such as laminated steel) with a permanent magnet therein. The rotor 41 is in the form of a cylinder, and has its radially inner side fixed to the rotary shaft 8 via a rotor boss 13. As illustrated in FIGS. 2 and 3, the rotor boss 13 is a tubular member having an outer circumferential surface 13a and an inner circumferential surface 13b.

The rotor 41 is attached to the outer circumferential surface 13a of the rotor boss 13. The inner circumferential surface 13b of the rotor boss 13 is fixed to the rotary shaft 8. With this, the rotor 41 rotates together with the rotary shaft 8 about an axis C1 of the rotary shaft 8.

As illustrated in FIGS. 2 and 3, the rotor boss 13 has a flange 13c at its end closer to the driven machine 5. The outer diameter of the flange 13c is greater than the inner diameter of the rotor 41. The end surface of the rotor boss 13 that faces toward the driven machine 5 is recessed toward one end to have a recessed portion 13d.

As illustrated in FIG. 2, a first plate 18 abuts on the end surface of the rotor 41 that faces toward the engine 2. A second plate 19 abuts on the end surface of the rotor 41 that faces toward the driven machine 5. The first plate 18 and the second plate 19 are each in the form of a ring, and engaged with the outer circumferential surface of the rotor boss 13. Furthermore, a ring-shaped collar 20 is engaged with the outer circumferential surface of the rotor boss 13. The collar 20 is located closer to the engine 2 than the first plate 18 is to the engine 2. The first plate 18 is located between the collar 20 and the rotor 41. The second plate 19 is located between the flange 13c and the rotor 41.

The rotary shaft 8 is rotatably supported by at least one bearing 9. The at least one bearing 9 and the rotor 41 are arranged in a direction of the axis C1 of the rotary shaft 8 (hereinafter referred to as "axial direction C1"). The at least one bearing 9 is located closer to the driven machine 5 than the rotor 41 is to the driven machine 5. The at least one bearing 9 is located closer to the driven machine 5 than the rotor boss 13 is to the driven machine 5.

In the following description, one of opposite ends of the power transmission mechanism 1 in the axial direction C1 (engine 2 side end of the power transmission mechanism 1) (left end of the power transmission mechanism 1 in FIG. 1) is referred to as a "first end", and the other of the opposite ends of the power transmission mechanism 1 in the axial direction C1 (driven machine 5 side end of the power transmission mechanism 1) (right end of the power transmission mechanism 1 in FIG. 1) is referred to as a "second end". Furthermore, a direction orthogonal to the axial direction C1 and away from the axis C1 is referred to as a "radially outward direction", and a direction orthogonal to the axial direction C1 and toward the axis C1 is referred to as a "radially inward direction".

The rotary shaft 8 has one end portion located closer to the engine 2 side end (the first end), and has the opposite end portion located closer to the driven machine 5 side end (the second end). The one end portion of the rotary shaft 8 overlaps the flywheel 3 in the axial direction C1. The rotary shaft 8 is provided, at an outer periphery thereof, a torque transmitting part 10 which transmits rotational torque to the rotor 41. In the present preferred embodiment, the torque transmitting part 10 includes a key 14 engaged with the outer circumferential surface of the rotary shaft 8. The key 14 is fitted in a recessed portion 8a (see FIG. 3) in the outer circumferential surface of the rotary shaft 8. A plurality of such keys 14 are provided at a plurality of different positions (two positions in the present preferred embodiment) along the circumferential direction of the rotary shaft 8. As illustrated in FIG. 3, the inner circumferential surface of the rotor boss 13 has grooves (keyways) 13e to be engaged with the keys 14. Note that the torque transmitting part 10 is not limited to key(s), and may include, for example, spline(s). In such a case, the inner circumferential surface of the rotor boss 13 has groove(s) for insertion of the spline(s) (spline groove(s)).

The at least one bearing 9 includes a first bearing 91 and a second bearing 92. The first bearing 91 and the second bearing 92 are arranged in the axial direction C1 with a space therebetween. The at least one bearing 9 (the first bearing 91 and the second bearing 92) includes an inner ring attached to the outer circumferential surface of the rotary shaft 8 and an outer ring supported on a support cylinder 21.

The end of the support cylinder 21 that is closer to the second end (the driven machine 5 side end) is fixed to a transmission case 11 (described later). The end of the support cylinder 21 that is closer to the first end (the engine 2 side end) is located within an inner space of a motor case 16 (described later). Furthermore, the end of the support cylinder 21 that is closer to the first end is located in the recessed portion 13d of the rotor boss 13. The support cylinder 21 is a continuous cylinder extending from the interior of the motor case 16 to the interior of the transmission case 11. The support cylinder 21 supports the at least one bearing 9 within the motor case 16.

The power transmission mechanism 1 includes the above-described at least one bearing 9 and torque transmitting part 10, and therefore makes it possible to stabilize the rotation of the rotary shaft 8 and to reliably transmit high rotational torque from the rotary shaft 8 to the rotor 41.

The stator 42 is, for example, made of laminated steel with coil windings. Specifically, the stator 42 has a structure in which teeth project from the inner circumference of an annular yoke, and coils are wrapped around the teeth. The stator 42 is located radially outward of the rotor 41 and faces the rotor 41.

A cooling jacket 15 to cool the electric motor 4 is disposed around the stator 42. In the present preferred embodiment, the cooling jacket 15 is a water jacket 15. The water jacket 15 is in the form of a cylinder and is attached radially outward of the stator 42. The water jacket 15 has an inner passage (not illustrated) to allow passage of cooling fluid.

The electric motor 4 (the rotor 41 and the stator 42) and the water jacket 15 are housed in the motor case 16. The motor case 16 is attached radially outward of the water jacket 15. The motor case 16 is connected to the flywheel housing 7. The interior space of the motor case 16 and the interior space of the flywheel housing 7 are in communication with each other.

As illustrated in FIG. 2, an annular cover member 17 is fixed with bolt(s) and/or the like to the end surface of the motor case 16 that is closer to the first end. The motor case 16 is provided, at its portion closer to the second end, with a protrusion 16a which protrudes in the radially inward direction from the inner circumferential surface of the motor case 16. The water jacket 15 is supported between the cover member 17 and the protrusion 16a.

The driven machine 5 receives power from the engine 2 and/or the electric motor 4, and is driven by the power. In the present preferred embodiment, the driven machine 5 is a transmission which transmits power from the engine 2 to wheels. More specifically, the driven machine 5 is a hydraulic pump of a hydrostatic transmission. The hydraulic pump is connected to the end of the rotary shaft 8 that is closer to the second end. In the following description, the driven machine 5 is referred to as a transmission 5.

As illustrated in FIG. 1, the transmission 5 is housed in the transmission case 11. The transmission case 11 is connected to the motor case 16. The transmission case 11 is connected to the flywheel housing 7 via the motor case 16. With this, the interior space of the transmission case 11, the interior space of the motor case 16, and the interior space of the flywheel housing 7 are in communication with each other.

As illustrated in FIGS. 1 and 2, the electric motor 4 is housed such that the electric motor 4 extends from the interior of the motor case 16 to the interior of the transmission case 11. The rotary shaft 8 extends from the interior of the flywheel housing 7 through the interior of the motor case 16 to the interior of the transmission case 11. The rotary shaft 8 defines and functions also as an input shaft of the transmission 5. That is, the rotary shaft of the rotor 41 and the input shaft of the transmission 5 are composed of a single, identical shaft. In the present preferred embodiment, the input shaft of the transmission 5 is connected to a hydraulic pump of a hydrostatic transmission.

The damper 6 is connected to the rotary shaft 8 and the flywheel 3. The damper 6 is entirely or partially formed of an elastic or flexible material such as a rubber and/or a resin. As illustrated in FIGS. 2 and 3, the damper 6 includes an inner section 61 and an outer section 62.

The inner section 61 is attached to the rotary shaft 8. Specifically, the inner section 61 is in the form of a cylinder, and its inner circumferential surface is fitted in/on the outer circumferential surface of the rotary shaft 8.

The outer section 62 is attached to the flywheel 3. The outer section 62 is a plate-shaped section thinner than (smaller in dimension along the axial direction C1 than) the inner section 61. The outer section 62 extends in the radially outward directions from the outer circumferential surface of the inner section 61. As illustrated in FIG. 3, the outer section 62 includes a first section 621, a second section 622, and a third section 623. The first section 621, the second section 622, and the third section 623 are arranged at regular intervals along the direction of the circumference of the outer circumferential surface of the inner section 61. The outer section 62 (the first section 621, the second section 622, and the third section 623) has through hole(s) 62a. Bolt(s) (not illustrated) is/are inserted in the through hole(s) 62a of the outer section 62, and the bolt(s) are screwed into threaded hole(s) 3a in the end surface of the flywheel 3 that is closer to the second end. With this, the damper 6 is attached to the surface of the flywheel 3 that is closer to the second end.

As illustrated in FIGS. 2 and 3, the end surface of the flywheel 3 that is closer to the second end is recessed toward the first end to have a recessed portion 3b. The recessed portion 3b includes a first recessed portion 3b1, a second recessed portion 3b2, and a third recessed portion 3b3. The end surface of the flywheel 3 that is closer to the second end is recessed in the form of a cylinder to have the first recessed portion 3b1. The end surface of the first recessed portion 3b1 that is closer to the second end is recessed in the form of a cylinder to have the second recessed portion 3b2. The end surface of the second recessed portion 3b2 that is closer to the second end is recessed in the form of a cylinder to have the third recessed portion 3b3. The first recessed portion 3b1, the second recessed portion 3b2, and the third recessed portion 3b3 are arranged concentrically with each other. The diameter of the second recessed portion 3b2 is smaller than the diameter of the first recessed portion 3b1. The diameter of the third recessed portion 3b3 is smaller than the diameter of the second recessed portion 3b2. The first recessed portion 3b1 has the threaded hole(s) 3a.

As illustrated in FIG. 2, the damper 6 is disposed such that the damper 6 is inserted in the recessed portion 3b of the flywheel 3. Specifically, the outer section 62 of the damper 6 is disposed such that the outer section 62 is inserted in the first recessed portion 3b1. The inner section 61 of the damper 6 is disposed such that the inner section 61 is inserted in the second recessed portion 3b2. This makes it possible to reduce the dimension of an assembly of the flywheel 3 and the damper 6 in the axial direction C1.

As illustrated in FIG. 2, the damper 6 bridges the boundary between the flywheel housing 7 and the motor case 16. That is, the damper 6 is housed such that the damper 6 extends from the interior of the flywheel housing 7 to the interior of the motor case 16. In other words, the damper 6 overlaps the flywheel housing 7 and the motor case 16 in the axial direction C1.

As described earlier, the inner section 61 of the damper 6 is attached to the rotary shaft 8 and the outer section 62 of the damper 6 is attached to the flywheel 3, and thereby the flywheel 3 and the rotary shaft 8 are coupled via the damper 6. Note here that the flywheel 3 and the rotary shaft 8 are not connected directly but coupled via the damper 6. Therefore, rotational power from the engine 2 is transmitted from the flywheel 3 to the rotary shaft 8 via the damper 6. With this, torque variations of the engine 2 are transmitted to the damper 6 via the flywheel 3 and absorbed by the damper 6, and therefore are not transmitted to the rotary shaft 8.

The engine 2 is disposed on one of opposite sides of the damper 6 (the same side of the damper 6 as the engine 2) in the axial direction C1 of the rotary shaft 8. The electric motor 4 is disposed on the other of the opposite sides of the damper 6 (the same side of the damper 6 as the driven machine 5) in the axial direction C1 of the rotary shaft 8. That is, the engine 2, the damper 6, and the electric motor 4 are arranged in this order in the axial direction C1 of the rotary shaft 8. In other words, the damper 6 is disposed between the engine 2 and the electric motor 4 in the axial direction C1 of the rotary shaft 8. The damper 6 and the rotor 41 of the electric motor 4 are arranged along the axial direction C1. This makes it possible to make the inner diameter of the rotor 41 smaller than when the damper 6 is disposed radially inside the rotor 41.

With the above-described power transmission mechanism 1, upon driving of the engine 2, rotational power from the engine 2 is transmitted to the flywheel 3 via the crankshaft 2a to cause the flywheel 3 to rotate. Rotational power from the flywheel 3 is transmitted to the rotary shaft 8 via the damper 6 to cause the rotary shaft 8 to rotate. The rotation of the rotary shaft 8 drives the driven machine 5. Furthermore, the rotation of the rotary shaft 8 causes the rotor 41 to rotate, causing the electric motor 4 to generate electricity. In such power transmission, torque variations of the engine 2 are absorbed by the damper 6 and therefore are not transmitted to the driven machine 5.

Upon driving of the electric motor 4 in addition to the driving of the engine 2, the rotor 41 rotates. The rotary shaft 8 rotates with the rotation of the rotor 41 to drive the driven machine 5. With this, the rotational power from the engine 2 is assisted by the rotational power from the electric motor 4.

As illustrated in FIGS. 1 and 2, the power transmission mechanism 1 includes a rotation detector 12.

The rotation detector 12 detects the phase of rotation of the rotor 41. The rotation detector 12 can be, for example, a resolver, an encoder, and/or the like, but is preferably a resolver which has high environmental resistance and which detects angle with high accuracy. The rotation detector 12 is disposed in the interior space of the support cylinder 21. Specifically, the rotation detector 12 is disposed between the inner circumferential surface of the support cylinder 21 and the outer circumferential surface of the rotor boss 13.

As illustrated in FIG. 1, the rotation detector 12 is connected to a controller 22. The controller 22 includes an inverter to control the electric motor 4 by vector control. The controller 22 is also connected to the engine 2, the electric motor 4, the driven machine 5, and/or the like. The controller 22 includes a CPU, memory (memories), and/or the like. The controller 22 is configured or programmed to control the driving, stopping, rotation speed, and/or the like of the engine 2, the electric motor 4, the driven machine 5, and/or the like on the basis of control program(s) and/or the like stored in the memory (memories) and/or the like.

Similar to the electric motor 4, the rotation detector 12 is disposed on the other of the opposite sides of the damper 6 (the same side of the damper 6 as the driven machine 5) in the axial direction C1 of the rotary shaft 8. With this, the phase of rotation of the rotor 41 after the absorption of torque variations of the engine 2 by the damper 6 can be detected by the rotation detector 12. Therefore, variations in detection value detected by the rotation detector 12 are prevented or reduced, the control of the electric motor 4 based on the detection value can be performed with high accuracy, and the efficiency of the electric motor 4 improves.

The power transmission mechanism 1 for an electric motor 4 as has been discussed achieves the following effects.

A power transmission mechanism 1 for an electric motor 4 includes an engine 2 including a crankshaft 2a, a flywheel 3 connected to the crankshaft 2a, an electric motor 4 including a rotor 41 to rotate together with a rotary shaft 8, a damper 6 connected to the rotary shaft 8 and the flywheel 3, and a driven machine 5 to receive power from the engine 2 and/or the electric motor 4, wherein the damper 6 is located between the engine 2 and the electric motor 4 in an axial direction C1 of the rotary shaft 8.

With the configuration, since the damper 6 is located between the engine 2 and the electric motor 4 in the axial direction C1 of the rotary shaft 8 rotating together with the rotor 41 and is connected to the rotary shaft 8 and the flywheel 3, the damper 6 is capable of absorbing torque variations of the engine 2, and the outer diameter of the electric motor 4 can be reduced. Furthermore, since the damper 6 is connected to the flywheel 3, the length of the power train (dimension in the axial direction C) can be reduced.

The driven machine 5 is a transmission 5 to transmit power from the engine 2 and/or the electric motor 4 to one or more wheels. The rotary shaft 8 defines and functions also as an input shaft of the transmission 5.

The configuration eliminates the need for providing the rotary shaft of the rotor 41 and the input shaft of the transmission 5 independently of each other. This makes it possible to reduce parts count and reduce the size of the power transmission mechanism 1.

The power transmission mechanism 1 for the electric motor 4 further includes a rotation detector 12 to detect a phase of rotation of the rotor 41. The engine 2 is located on one of opposite sides of the damper 6 in the axial direction C1. The electric motor 4 and the rotation detector 12 are located on the other of the opposite sides of the damper 6 in the axial direction C1.

With the configuration, torque variations of the engine 2 are absorbed by the damper 6, and the phase of rotation of the rotor 41 of the electric motor 4 after the absorption of the torque variations can be detected with the rotation detector 12. With this, variations in detection value detected by the rotation detector 12 are prevented or reduced, the control of the electric motor 4 based on the detection value can be performed with high accuracy, and the efficiency of the electric motor 4 improves.

The power transmission mechanism 1 for the electric motor 4 further includes a bearing 9 which rotatably supports the rotary shaft 8. The rotary shaft 8 is provided, at an outer periphery thereof, with a torque transmitting portion 10 to transmit rotational torque to the rotor 41. The torque transmitting portion 10 includes one or more keys or one or more splines.

The configuration makes it possible to cause the rotary shaft 8 to rotate stably, and reliably transmit high rotational torque from the rotary shaft 8 to the rotor 41.

The power transmission mechanism 1 for the electric motor 4 further includes a flywheel housing 7 which houses the flywheel 3, a motor case 16 which is connected to the flywheel housing 7, and a transmission case 11 which is connected to the motor case 16 and which houses the transmission 5. The electric motor 4 is housed such that the electric motor 4 extends from an interior of the motor case 16 to an interior of the transmission case 11. The rotary shaft 8 extends from an interior of the flywheel housing 7 through the interior of the motor case 16 to the interior of the transmission case 11.

The configuration makes it possible to reduce the length of the power train extending from the flywheel 3 to the transmission 5.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power transmission mechanism comprising:
an engine including a crankshaft;
a flywheel connected to the crankshaft;
an electric motor including a rotor to rotate together with a rotary shaft;
a damper connected to the rotary shaft and the flywheel;
a driven machine to receive power from the engine and/or the electric motor;
a flywheel housing which houses the flywheel;
a motor case which is connected to the flywheel housing; and
a transmission case which is connected to the motor case and which houses a transmission; wherein
the damper is located between the engine and the electric motor in an axial direction of the rotary shaft;
the driven machine includes the transmission to transmit power from the engine and/or the electric motor to one or more wheels;
the electric motor is housed such that the electric motor extends from an interior of the motor case to an interior of the transmission case; and
the rotary shaft defines and functions as an input shaft of the transmission and extends from an interior of the flywheel housing through the interior of the motor case to the interior of the transmission case.

2. The power transmission mechanism according to claim 1, further comprising a rotation detector to detect a phase of rotation of the rotor; wherein
the engine is located on one of opposite sides of the damper in the axial direction; and
the electric motor and the rotation detector are located on the other of the opposite sides of the damper in the axial direction.

3. The power transmission mechanism according to claim 2, further comprising:
a bearing which rotatably supports the rotary shaft; and
a support cylinder which supports an outer circumferential surface of the bearing; wherein
the rotation detector is located in an interior space of the support cylinder.

4. The power transmission mechanism according to claim 3, further comprising a rotor boss including:
an outer circumferential surface having the rotor attached thereto; and
an inner circumferential surface fixed to the rotary shaft; wherein
the rotation detector is located between an inner circumferential surface of the support cylinder and the outer circumferential surface of the rotor boss.

5. The power transmission mechanism according to claim 1, further comprising a bearing which rotatably supports the rotary shaft; wherein
the rotary shaft is provided, at an outer periphery thereof, with a torque transmitting portion to transmit rotational torque to the rotor; and
the torque transmitting portion includes one or more keys or one or more splines.

6. The power transmission mechanism according to claim 1, wherein
an end surface of the flywheel that faces the damper is recessed toward an opposite end surface of the flywheel to have a recessed portion; and
the damper is located in the recessed portion.

7. The power transmission mechanism according to claim 6, wherein:
the damper includes an inner section attached to the rotary shaft and an outer section attached to the flywheel;
the recessed portion includes a first recessed portion and a second recessed portion, the end surface of the flywheel is recessed to define a cylinder including the first recessed portion, and an end surface of the first recessed portion is recessed to define a cylinder including the second recessed portion;
the outer section is located in the first recessed portion; and
the inner section is located in the second recessed portion.

8. The power transmission mechanism according to claim 1, wherein the damper overlaps the flywheel housing and the motor case in the axial direction.

9. A power transmission mechanism comprising:
an engine including a crankshaft;
a flywheel connected to the crankshaft;
an electric motor including a rotor to rotate together with a rotary shaft;
a damper connected to the rotary shaft and the flywheel; and
a driven machine to receive power from the engine and/or the electric motor; wherein
an end surface of the flywheel that faces the damper is recessed toward an opposite end surface of the flywheel to have a recessed portion;
the damper includes an inner section attached to the rotary shaft and an outer section attached to the flywheel, and is located between the engine and the electric motor in an axial direction of the rotary shaft such that the damper is located in the recessed portion;
the recessed portion includes a first recessed portion and a second recessed portion, the end surface of the flywheel is recessed to define a cylinder including the first recessed portion, and an end surface of the first recessed portion is recessed to define a cylinder including the second recessed portion;
the outer section is located in the first recessed portion; and
the inner section is located in the second recessed portion.

10. A power transmission mechanism comprising:
an engine including a crankshaft;
a flywheel connected to the crankshaft;
an electric motor including a rotor to rotate together with a rotary shaft;
a damper connected to the rotary shaft and the flywheel;
a driven machine to receive power from the engine and/or the electric motor;
a rotation detector to detect a phase of rotation of the rotor;
a bearing which rotatably supports the rotary shaft; and
a support cylinder which supports an outer circumferential surface of the bearing; wherein
the damper is located between the engine and the electric motor in an axial direction of the rotary shaft;
the engine is located on one of opposite sides of the damper in the axial direction;
the electric motor and the rotation detector are located on the other of the opposite sides of the damper in the axial direction; and
the rotation detector is located in an interior space of the support cylinder.

\* \* \* \* \*